(No Model.) 2 Sheets—Sheet 1.
E. J. VRAALSTAD.
COMBINED BAND CUTTER AND FEEDER.
No. 420,129. Patented Jan. 28, 1890.
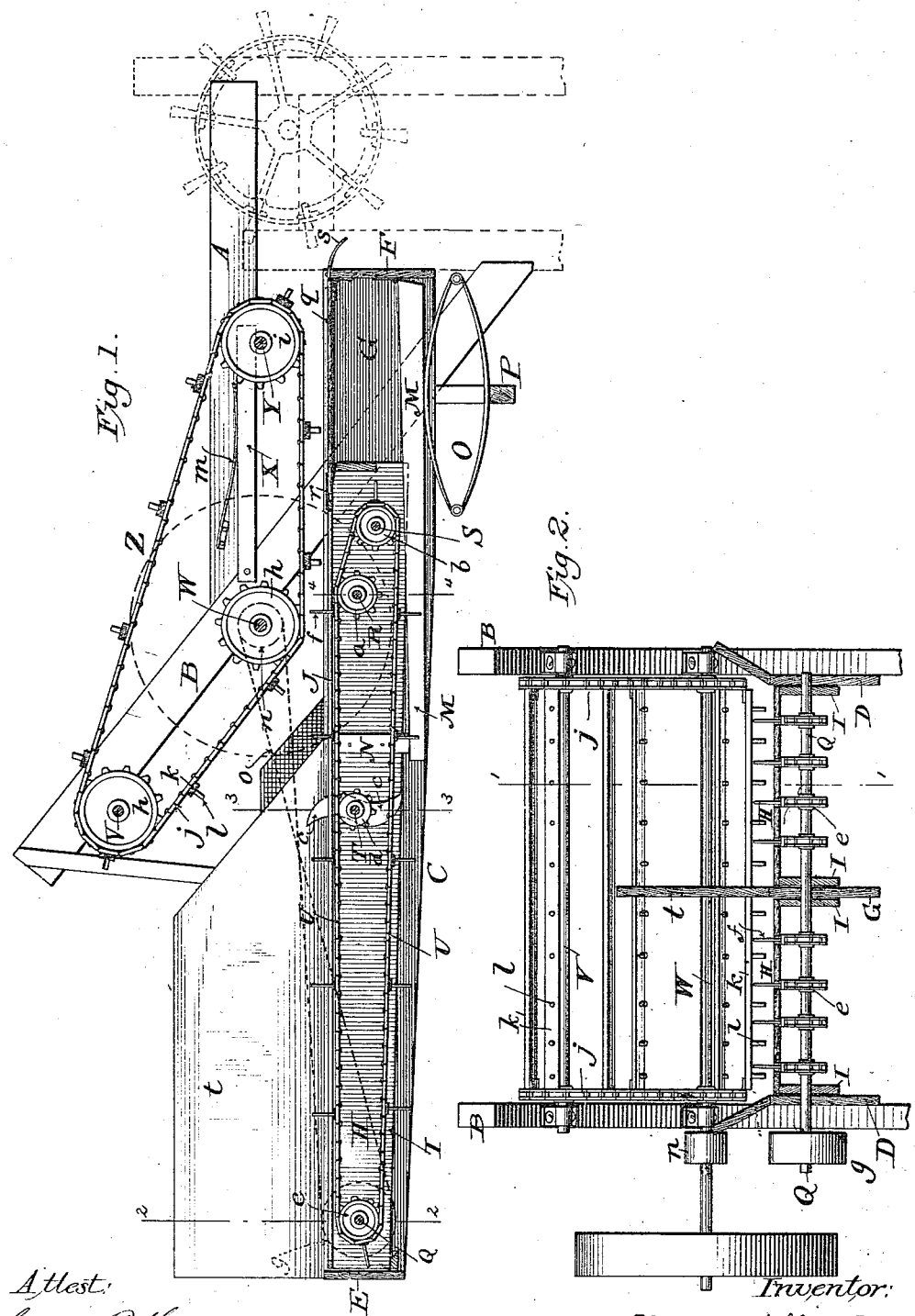
Attest:
Sidney P. Hollingsworth
Horace A. Dodge
Inventor:
Edward J. Vraalstad,
by Dodge Sons.
Attys.

(No Model.) 2 Sheets—Sheet 2.
E. J. VRAALSTAD.
COMBINED BAND CUTTER AND FEEDER.
No. 420,129. Patented Jan. 28, 1890.
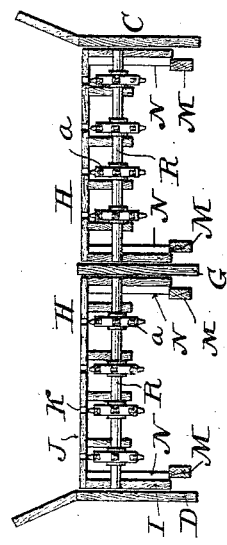
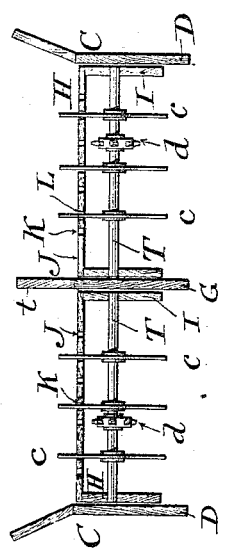
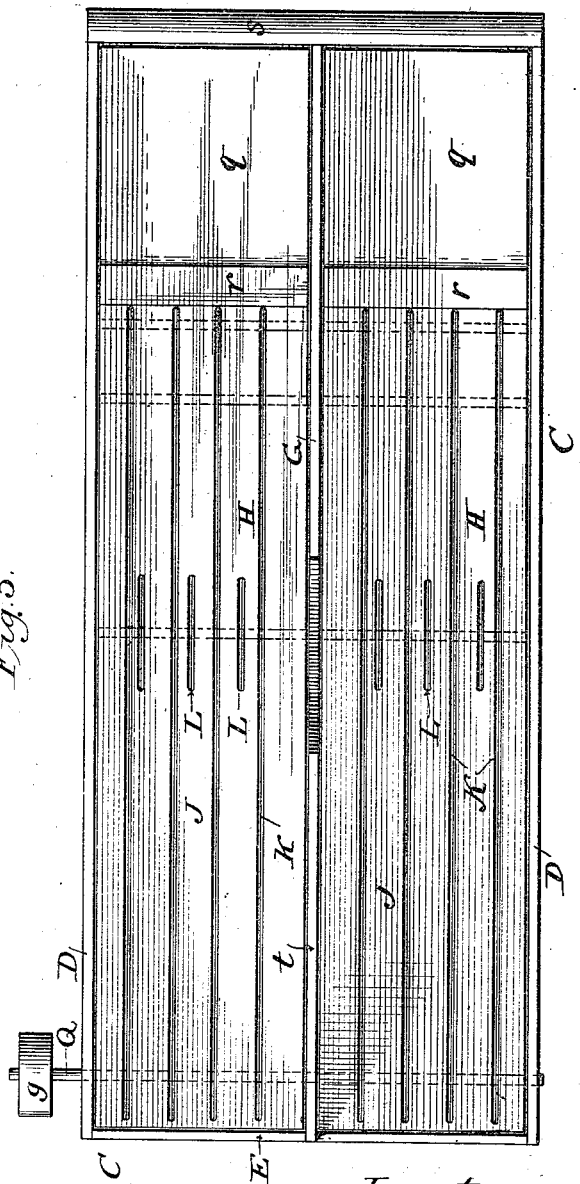
Attest:
Sidney P. Hollingsworth
Horace A. Dodge
Inventor:
Edward J. Vraalstad,
by Dodge Sons,
Attys.

UNITED STATES PATENT OFFICE.

EDWARD J. VRAALSTAD, OF HILLSBOROUGH, (DAKOTA TERRITORY,) NORTH DAKOTA.

COMBINED BAND-CUTTER AND FEEDER.

SPECIFICATION forming part of Letters Patent No. 420,129, dated January 28, 1890.

Application filed May 31, 1889. Serial No. 312,719. (No model.)

*To all whom it may concern:*

Be it known that I, EDWARD J. VRAALSTAD, a citizen of the United States, residing at Hillsborough, in the county of Traill and State of North Dakota, have invented certain new and useful Improvements in Combined Band-Cutter and Feeder, of which the following is a specification.

My invention relates to band-cutters and feeders for thrashing-machines, and has reference more particularly to that class of machines in which the grain is delivered to the cylinder of the thrasher by means of continuously-traveling endless chains, aprons, or belts, between which the material passes.

In the preferred form of my machine there will be two or more endless chains, belts, or aprons carried in frames pivoted at the receiving end and spring-sustained at the delivery end, the chains being provided with arms or fingers working through slots in the floor or platform of the frames, and acting in conjunction with these chains or belts is a feeding belt or apron moving at a greater speed than the receiving-chains, the said feeding belt or apron being located above the receiving-chains and having its delivery end pressed downward by a spring or springs. Rotating knives or cutters serve to cut or sever the band before or just at the time that the grain enters beneath the apron.

Referring now to the drawings, Figure 1 is a longitudinal sectional view on the line 1 1, Fig. 2; Fig. 2, a transverse sectional view on the line 2 2, Fig. 1; Fig. 3, a sectional view on the line 3 3, Fig. 1; Fig. 4, a sectional view on the line 4 4, Fig. 1; and Fig. 5, a top plan view of the platform.

A A indicate beams projecting horizontally from the frame of the thrasher, to which they are bolted or otherwise rigidly secured, said beams being in turn secured to inclined beams or frame-pieces B B, which extend upward from the frame of the thrashing-machine above the beams A A, as shown in Fig. 1.

Secured to and projecting horizontally from the frame of the thrasher, between the beams B B, is an open rectangular frame C, comprising sides D, ends E and F, and a central partition G. The sides are extended upward above the ends, as shown in Figs. 1, 2, and 3, to prevent the grain from working off at the sides. The central partition (in the present instance) divides the supporting-frame C into two spaces, in each of which is mounted a frame or platform H, having sides I I and a top or floor J, provided with longitudinal slots K, extending nearly the whole length of the same. The floor J is provided also with short slots L between the slots K to receive the rotary cutters, hereinafter referred to.

Pivoted or hinged to the end-board F are two levers M, which extend outward parallel with the sides I I of the platform or frame H and serve to support the ends thereof, the sides of the frame being provided with cleats N on their inner faces to rest upon the free ends of the levers. Beneath and supporting each lever M is a spring O, which rests upon or is carried by a cross-bar P, secured to the frame C. At the receiving end the platform H is pivotally connected with the frame C by means of a shaft Q, which extends transversely through the frames C and H, as shown in Fig. 2, thus permitting the inner end of the frame H to rise and fall, the spring serving to return the frame to its normal position.

In the drawings I have shown the main frame C as divided by the central partition G into two open frames, in each of which is mounted a frame H, and as these frames H and attendant parts are duplicates the description of one of the frames H will apply to all of them. Near the inner end of the frame H are two shafts R and S, which are journaled in the side pieces I I of said frames, and which are provided, respectively, with sprocket-wheels $a$ and $b$, the said shaft S being located slightly in advance of and below the shaft R, as shown in Fig. 1.

T indicates a shaft journaled in the side pieces I I, parallel with but between the shafts Q and R, said shaft T being provided with knives or blades $c$ and with one or more sprocket or chain wheels $d$, as shown in Figs. 1 and 3, the knives or cutters $c$ projecting upward through the slots L of the floor of the frame H.

U U indicate endless chains, which pass about sprocket-wheels $e$ on shaft Q and the wheels $b$ on shaft S, the said chains being supported at their forward ends by the wheels $a$ of shaft R, as shown in Fig. 1. The number of chains and sprocket-wheels may be varied as desired, and will correspond with the number of slots or openings K in the floor J. Each chain is provided with fingers $f$, projecting upwardly through the slots above the floor J, as shown in Figs. 1 and 2, and which serve to carry the grain forward toward the feeding-apron, hereinafter referred to. One or more of the chains U is adapted to run in contact with the sprocket-wheel $d$ on the cutter-shaft T and impart the necessary motion thereto, motion being imparted to the chains from shaft Q, which is provided at one end with a band-wheel $g$.

Secured to the beams B B are shafts V and W, provided with a sprocket-wheel $h$ at each end, said shafts being located, respectively, above the shafts T and R, though this is not essential. Pivoted to the inner faces of the beams B B are arms or levers X, carrying at their outer or free ends a shaft Y, provided at each end with a sprocket-wheel $i$, as shown in Fig. 1, the shafts W and Y being approximately in the same horizontal plane.

Z indicates the feeding apron or belt, which passes about the sprockets on the shafts V, W, and Y, said feeding-apron comprising chains $j$, slats $k$, and teeth or fingers $l$, as clearly shown in Figs. 1 and 2. Springs $m$, secured to the beams A, press or bear down upon the outer ends of the levers or arms X and aid in keeping the inner end of the feeding-apron down to its work. Shaft W is provided with a belt-pulley $n$, about which and the pulley $g$ of shaft Q a belt $o$ passes, motion being imparted to the shaft W, through its band-wheel $p$, from any convenient source. A floor-piece $q$ is hinged to the upper edge of end-board F of frame C and extends outward and rests upon the inner end of the frame H, as shown in Figs. 1 and 5, the space between the end of said floor-piece and the floor J being covered by a plate $r$, secured to the floor. A guard-plate or bridge $s$, secured to the upper edge of the end-board F, serves to direct the grain into the concave of the thrasher.

The machine is provided with the ordinary center-board $t$, which is located directly in line with the partition G, so as not to interfere with the rising and falling of the frames H.

The operation is as follows: Bound bundles of grain are placed upon the top or floor of the frames H, and are caught by the prongs $f$ of the chains U and carried forward toward the feeding-apron Z; but before they pass beneath the latter the rotating knives or cutters sever the band and permit the sheaves to spread out or scatter, so as to feed evenly. The feeding-apron Z, traveling faster than the chains U, feeds the grain from the top, and, taking hold of the same just before the prongs $f$ of the chains U withdraw, carry it into the thrasher, as will be readily understood. While the frames H H are journaled upon the same shaft Q they are permitted to rise and fall independently of each other, which, coupled with the fact that the delivery end of the apron Z is yielding, precludes the choking or clogging of the machine. Should too much grain be fed beneath the apron Z, the inner end of the frame H would be depressed, the levers M swinging downward and compressing the springs O; but as soon as the apron Z, which acts upon the top of the body of grain, removes some of it the frame H will gradually resume its normal position. The crowding or choking is avoided to a limited extent by the rising of the shaft Y; but as the choking would be most likely to occur beneath the shaft W, whose bearings are fixed, it is necessary to provide for the depression of the frames H to obviate the greater part of the difficulty.

If desired, the shaft S may be omitted, and it is likewise obvious that the framing may be varied considerably without departing from my invention.

Having thus described my invention, what I claim is—

1. In combination with a supporting-frame, the pivoted frame adapted to receive the grain-feeding chains mounted in said frame, a feeding-apron located above the chains, and means for imparting motion to the chains and apron.

2. In combination with a supporting-frame, the pivoted frame mounted therein, feeding-chains mounted in the pivoted frame, a feeding-apron located above the chains and provided with a yielding support at its inner end, and means for imparting motion to the chains and apron.

3. In combination with the supporting-frame, the frame H, pivoted at its outer end to the supporting-frame, a spring supporting the inner end of said frame H, feeding-chains mounted in said frame, a feeding-apron located above the chains, and means for imparting motion to the chains and apron.

4. In combination with the open supporting-frame, a frame H, pivoted at its outer end within the supporting-frame, chains carried by said frame H, a lever or bar pivoted or hinged to the supporting-frame at its inner end and extending inward to support the frame H, a spring supporting said bar or lever, a feeding-apron located above the inner end of the frame H, and means for imparting motion to the apron and chains.

5. In combination with the open supporting-frame C, the frames H H mounted therein, a through-shaft Q, pivotally connecting the frames H H and C at their outer ends, sprocket-wheels secured to said shaft, a shaft at the inner end of each frame H, provided with sprocket-wheels, chains U, passing about the sprockets, a support for the inner ends of the frames H, a feeding-apron above the said frames, and means for imparting motion to the shaft Q and to the apron.

6. In combination with the open supporting-frame C, two frames H H, located side by side within the frame C, to which they are pivotally connected at their outer ends, supports for the inner ends of the frames H H, chains mounted in said frames, a feeding-apron located above and extending across the ends of both frames H H, and means for imparting motion to the chains and apron.

7. In combination with the open supporting-frame, the frame pivotally secured thereto at its outer end and provided with feeding-chains, the floor-piece pivoted to the supporting-frame and resting on the inner end of the frame H, a support for the said inner end, and a feeding-apron located above the frame H.

8. In combination with an open supporting-frame having a center-board, the independent pivoted frames H on either side of said center-board, provided with feeding-chains and with a support for their inner ends, and a feeding-apron located above the frames H H.

9. In combination with an open supporting-frame C, a frame H, pivoted thereto at one end and provided with a yielding support at its inner end, a rotating band-cutter and feeding-chains carried by said frame H, a feeding-apron located above the said frame, and means for imparting motion to the cutters, chains, and apron.

10. In combination with a frame H, provided at opposite ends with shafts Q R, having sprocket-wheels, a shaft T between the shafts Q R, provided with cutters and with a sprocket-wheel, and a chain (or chains) passing about the sprockets on shafts Q R and engaging with the sprocket on shaft T, all substantially as shown.

11. In combination with frame H, provided with the top J, having slots K and L, shafts Q and R, located at opposite ends of the frame and provided with sprocket-wheels, an intermediate shaft T, provided with a sprocket-wheel $d$ and with cutting blades or knives, which latter project up through the slots L, and chains U, having prongs $f$, to extend upward through the slots J, one of said chains imparting motion to the shaft T, all substantially as shown.

12. In combination with the slotted floors J, the chains U, provided with prongs to work in the slots, means for imparting motion to the chains, a feeding-apron Z, located above the chains, and means for imparting motion to the apron, the said apron traveling faster than the chains, all substantially as shown.

13. In combination with a supporting-frame, shafts V W, provided with sprocket-wheels, arms or levers X, pivoted to the frame, shaft Y, carried by said arms and provided with sprockets, and an apron Z, passing about the sprocket-wheels on the shafts.

14. In combination with a supporting-frame, the arms X, pivoted thereto and carrying at their outer ends the shaft Y, a shaft W, mounted in bearings on the frame approximately in the same plane with the shaft Y, a shaft V above the shafts W and Y, sprocket-wheels secured to said shafts, a feeding-apron passing about the sprocket-wheels, and a spring $m$, bearing upon the outer end of the arms X.

In witness whereof I hereunto set my hand in the presence of two witnesses.

EDWARD J. VRAALSTAD.

Witnesses:
JAMES E. HYDE,
WALTER L. CARTER.

It is hereby certified that in Letters Patent No. 420,129, granted January 28, 1890, upon the application of Edward J. Vraalstad, of Hillsborough, North Dakota, for an improvement in a "Combined Band-Cutter and Feeder," an error appears in the printed specification requiring the following correction, viz: In line 93, page 2, the word "grain-feeding" should read *grain, feeding;* and that the said Letters Patent should be read with this correction therein that the same may conform to the record of the case in the Patent Office.

Signed, countersigned and sealed this 4th day of February, A. D. 1890.

[SEAL.]

CYRUS BUSSEY,
          *Assistant Secretary of the Interior.*

Countersigned:
    C. E. MITCHELL,
        *Commissioner of Patents.*